UNITED STATES PATENT OFFICE.

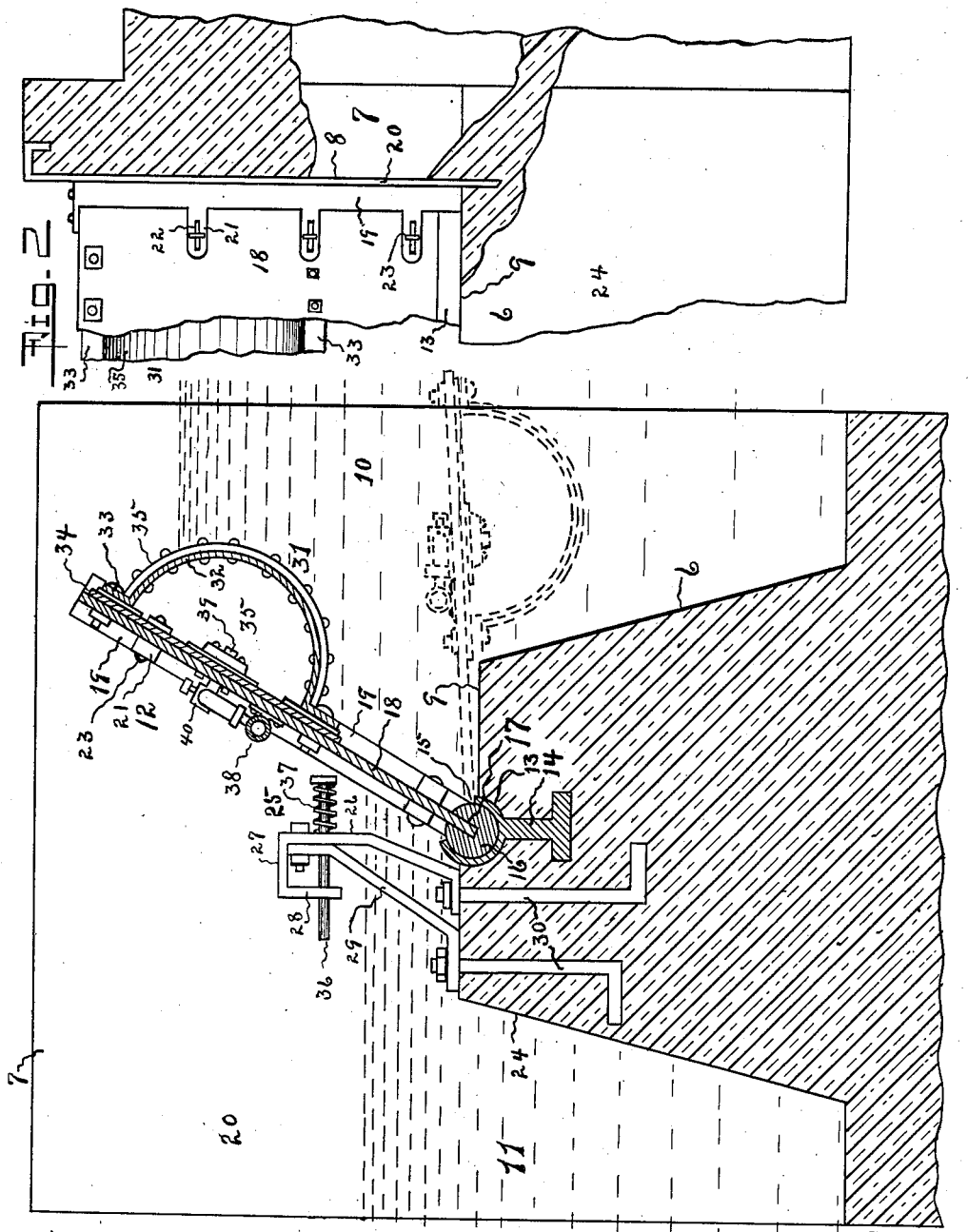

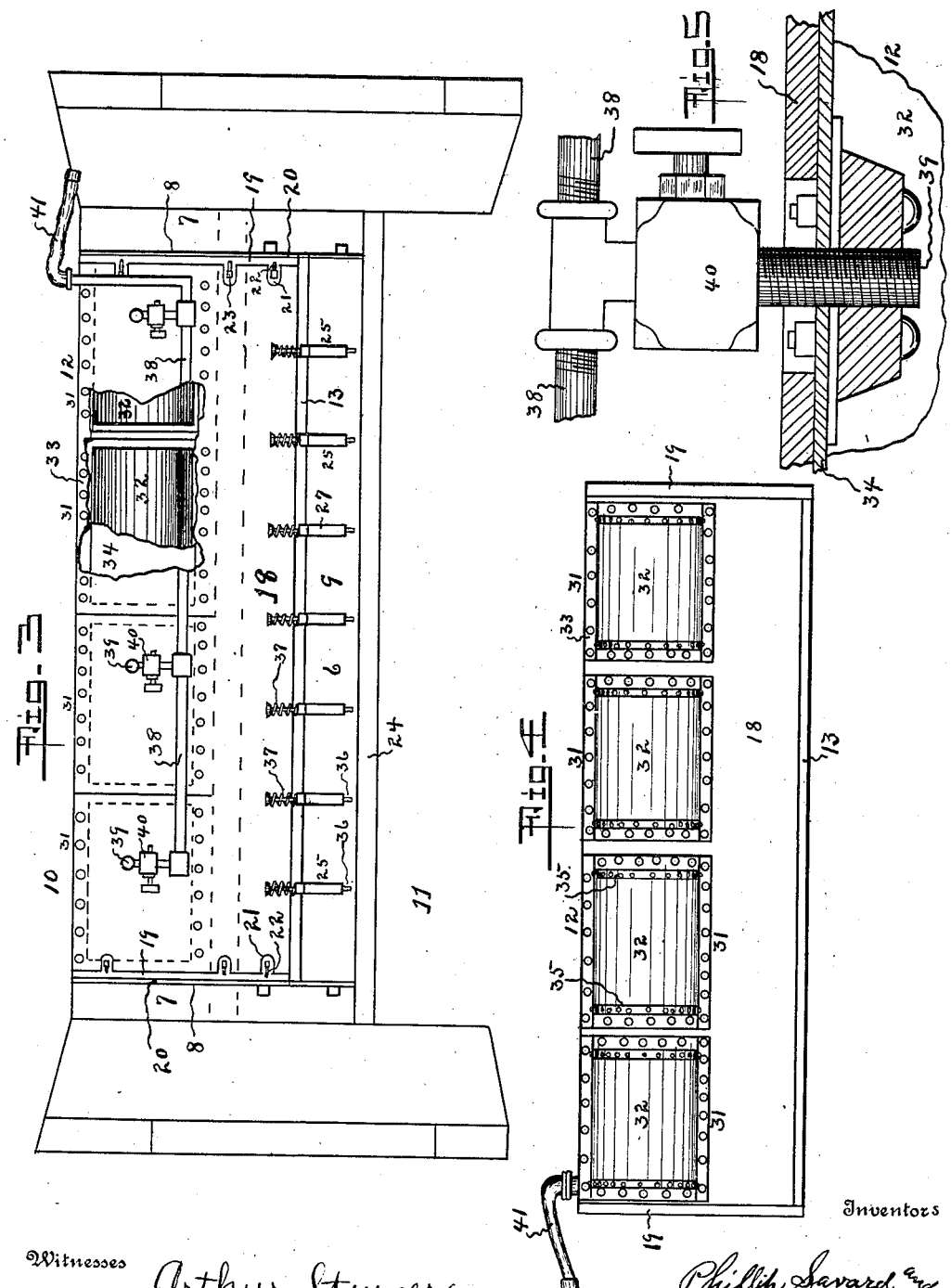

PHILLIP SAVARD AND ARTHUR SAVARD, OF OMAHA, NEBRASKA.

MOVABLE CREST FOR DAMS.

968,082.  Specification of Letters Patent.   Patented Aug. 23, 1910.

Application filed November 8, 1909. Serial No. 526,776.

*To all whom it may concern:*

Be it known that we, PHILLIP SAVARD and ARTHUR SAVARD, citizens of the United States, residing at Omaha, in the county of Douglas and State of Nebraska, have invented certain new and useful Improvements in Movable Crests for Dams, of which the following is a specification.

This invention relates to improvements in movable crests for dams and has for its object, broadly, to provide a means for the automatic control of flowing water or the influx of tide water, said means to consist of few and simple parts so that it will be durable when operated, and will not be attended with undue expense in construction.

In some instances where fresh water flows into the sea, it is desirable to prevent the tide water from obstructing said flow. This may be accomplished in a practical way by the herein described means, and may be employed to advantage at the mouths of rivers or estuaries where the channel is sufficiently narrow, and said means will operate reliably and automatically, to allow a passage to the sea of the fresh water, the tide water being prevented from entering the channel or stream.

The flow of fresh water streams referred to is often depended upon in localities near the sea coast, for irrigation purposes, and the influx of tide water is therefore a great disadvantage, and prevents the use of large tracts of land which otherwise would be valuable for agricultural purposes.

The invention has reference to a crest mounted upon a water dam adapted to have a swinging movement thereon while buoyed by the salt water, the crest operating to permit passage to the sea of fresh water, but preventing the influx of salt water.

The invention consists of the novel combination and arrangement of parts as described herein, pointed out by the claims and as illustrated in the drawing, it being understood that changes in form, size, proportion and minor details may be made within the scope of the claims without departing from the spirit or sacrificing any of the advantages of the invention.

In the accompanying drawing forming a part of the application, Figure 1 is a transverse sectional view of a dam with an automatically actuated crest thereon embodying our invention. Fig. 2 is a broken away detail relating to Fig. 1, showing one of the ends of the dam and crest, the view being partly in section. Fig. 3 is a plan view of the dam and its approaches, the crest being shown partly broken away and in a lowered position. Fig. 4 is a plan view of one of the sides of the crest, being the reverse side to that shown in Fig. 3. Fig. 5 is an enlarged detail, partly in section and showing tubular connection between the main air supply pipe and one of the float sections.

Referring now to the drawing for a more particular description, numeral 6 indicates a horizontal water dam or substructure of cement, concrete, or other like material usually employed for a permanent structure of this kind, and at 7 are indicated approaches at the ends of the dam, these approaches having a greater altitude than the dam proper; and the inner sides of the approaches are formed with vertical facets or flat surfaces 8 disposed at right angles to the horizontal bed 9 or upper surface of the dam.

The devices hereinafter described may be used to advantage in the automatic control of tide water, to prevent its movement into the mouths of fresh water streams, rivers, or estuaries.

In Figs. 1 and 3 salt water and fresh water are respectively indicated at 10 and 11, and it will be understood that the dam may have any suitable length, the space between the approaches being a passage way through which fresh water may pass into the sea, subject to the control of the herein described means.

We provide any suitable pivotal mounting for the movable crest 12, as the longitudinal bracket or socket member 13, which may have its stem 14 embedded in the dam as clearly shown in Fig. 1, its longitudinal slot 15 having an extent or occupying an arc, transversely considered, of 45 degrees, said slot opening upon the upper surface of the dam substantially midway between its sides.

At 16 is indicated a horizontal pivot member or shaft adapted to have a seating within the longitudinal socket member 13 and provided with a longitudinal groove 17 within which the lower edge of the longitudinal plate or wing 18 may be secured, said wing having a width equal to or somewhat greater than the height to which the tide water may rise. Also wing 18 has a length substantially equal to the space between sides 8 of abutments 7, and its ends may be provided with shoes or contact plates 19.

The sides 8 referred to are preferably covered with metallic sheets or suitable bearing-plates 20, so that they will present flat vertical surfaces upon which shoes or plates 19 may make slidable contact to prevent water from passing therebetween, and the crest thus described may be swung transversely upon its pivotal mounting, shoes 19 remaining in contact with the surface of sheets 20.

Shoes or plates 19 are provided with adjustable means, as brackets 21 having slots 22; and by means of bolts or keepers 23 mounted therein, when plates or shoes 19 become worn, an adjustment may be made so that a suitable contact may be made of the shoes with plates 20. By referring to Fig. 1 it will be seen that brackets 21 have a bearing upon the sides of wing 18.

Between the pivotal mounting of the movable crest and side 24 of the dam are mounted a plurality of braces 25. They preferably have a body portion 26 disposed in the vertical plane of socket member 13, said body portion having an outwardly projecting arm 27 with a downwardly extending part 28, arms 27 extending toward the "fresh water" side of the dam. Braces 25, as described, are preferably formed as angular plates, and we employ the inclined reinforcing plates indicated at 29 disposed outwardly of braces 25, their upper ends being secured to the body portions of the braces, their upper ends abutting arms 27; and the braces and reinforcing plates may be secured to footing-bars 30, the latter being embedded in the concrete material of the dam.

The braces thus described are mounted in horizontal alinement, and they are substantially parallel with the crest; they provide means which may be conveniently constructed and are effective for resisting the movement of the crest in one direction when the considerable force of tide water is applied to said crest. We provide floats 31. They are preferably employed in sections; and in order that they may be conveniently constructed and to the end that they may be substantially "air tight," curved plates 32 are bolted at their side flanges 33 to plate or wing 18, reinforcing plate 34 preferably being employed therebetween, the floats being disposed as near the free edge of wing 18 as possible; end-portions or plates 35 may circumscribe the ends of curved plates 32 and may be riveted thereon; and the floats thus described have a buoyancy sufficient to cause the crest to float upon the sea water.

In operation, when the tide recedes, the crest will automatically swing downward and will dispose itself in the position indicated by dotted lines in Fig. 1. At this time any fresh water which has accumulated may flow into the sea, as is obvious. When the tide rises, the crest will be elevated by means of the floats, and will be prevented from passing to the "fresh water" side of the dam.

At 36 are indicated plungers or rods resiliently controlled by springs 37. They may be employed on the several braces, and the rods are slidable in their supports upon parts 28 and 26 of the braces, and in operation they prevent undue vibration or beating of the crest against the braces when the crest is elevated.

At 38 is indicated a main supply pipe through which air, under pressure from any convenient source of supply may be conveyed to and forced within any of the floats. Each of the floats may be provided with an intake tube 39, best shown in Fig. 5, said tube communicating with the supply pipe through valve 40. The supply pipe is preferably mounted upon the "fresh water" side of the crest, and at one of its ends it may be provided with the flexible tube or pipe 41 through which compressed air may be forced from any suitable source of supply, said compressed air tending to exclude any water which might enter the receptacles; and by opening cut-off valve 40, air may be forced within any one or within all of the compartments or float sections, after which the valves may be closed, in a well known manner.

It will be understood that in constructing the dam, it should have a height equal to or somewhat greater than that of salt water at low tide. The float sections or compartments rest upon salt water at all times, and rise and fall with the tide, the crest therefore providing a barrier to the influx of salt water. While the tide is rising there will be a slight accumulation of fresh water upon the "fresh water" side of the dam, but it will be discharged when the tide falls.

The upper surface of the dam over which water may pass generally has a less width, in cross section, than its base; and in practice, the pivotal mounting of the longitudinal barrier plate or crest should be sufficiently near to the edge of this surface so that the air compartments or float sections will swing clear of the dam when the crest is in its lowered position; and when the tide is at its lowest ebb, the float sections will be disposed outwardly of and somewhat lower than the upper surface of the dam, whereby the fresh water will not be obstructed at this time in its flow to the sea by any part of the crest.

Having fully described our invention, what we claim and desire to secure by Letters Patent of the United States, is,—

1. In combination with a dam having elevated end portions, of a lighter-than-water, longitudinally adjustable crest member disposed lengthwise between said elevated end portions upon said dam, said crest member adapted to have upwardly and downwardly swinging movements within an arc substantially of 90 degrees.

2. In combination with a water dam, a rectangular barrier plate disposed longitudinally of and having a mounting of one of its edges upon said dam, one of its sides near its opposite edge being provided with hollow, air-tight compartments; and a plurality of upright braces disposed in alinement adjacent to one of the sides of said barrier plate, said barrier plate adapted to have upwardly and downwardly swinging movements intermediate the upper ends of said braces and the upper surface of said dam.

3. In combination; a water dam, a rectangular barrier plate disposed longitudinally of and having a mounting of one of its edges upon said dam, one of its sides near its opposite edge being provided with hollow, air-tight compartments; a plurality of upright braces disposed adjacent to one of the sides of said barrier plate; said barrier plate adapted to have a swinging movement in a direction opposed to said upright braces, the compartments moving from a position above to a position at the side of said dam.

4. In combination; a water dam, a rectangular barrier plate disposed longitudinally of and having a mounting of one of its edges upon said dam, one of its sides near its opposite edge having hollow, air-tight compartments mounted thereon; a plurality of upright braces disposed adjacent to one of the sides of said barrier plate and provided with resiliently mounted stop-bars; said barrier plate adapted to have upward and downward swinging movements, in alternation, said upward swinging movement causing its engagement with said stop-bars.

5. In combination, a water dam; a longitudinal crest member disposed lengthwise of and pivotally mounted upon said dam, said crest member being provided with a plurality of air receptacles with intake pipes; a main air conducting pipe supported by said crest member in communication with the intake pipes of said air receptacles, and means between said air receptacles and said air conducting pipe to cause closures of said intake pipes.

6. In devices for the purpose described, the combination of a water dam, a rectangular barrier plate disposed longitudinally of and having a mounting of one of its edges upon said dam, one of its sides near its opposite edge being provided with air-containing receptacles with intakes; a main air-conducting pipe supported upon said barrier plate in communication with the intakes of said receptacles; means between said receptacles and said main air-conducting pipe to cause closures of said intakes; a plurality of upright braces suitably mounted upon the dam and disposed adjacent to one of the sides of said barrier plate, said plate adapted to have swinging movements between the upper terminals of said braces and the upper surface of said dam.

7. In devices for the purpose described, the combination of a water dam, a rectangular barrier plate disposed longitudinally of and having a mounting of one of its edges upon said dam, one of its sides near its opposite edge being provided with air-containing receptacles with intakes; a main air-conducting pipe carried by said barrier plate, said pipe being in communication with the intakes of said receptacles; means between said receptacles and said main air-conducting pipe to cause closures of said intakes; a plurality of upright braces suitably mounted upon said dam and disposed adjacent to a side of the barrier plate opposed to said receptacles, said braces having elastic fenders mounted upon their upper ends; said barrier plate adapted to have upward and downward swinging movements, in alternation and to move into engagement during its upward movement with said elastic fenders.

8. In devices for the purpose described, the combination with a water dam having elevated end-portions with upright bearing-plates mounted thereon, of a rectangular barrier-plate having contact-shoes adjustably mounted upon its ends, and provided adjacent one of its longitudinal edges with a plurality of hollow air-tight compartments; said barrier-plate being disposed substantially parallel with and having its opposite longitudinal edge seated upon said dam; said plate adapted to have transversely swinging movements, the compartments moving substantially from a vertical to a horizontal position, said adjustable shoes upon its terminals engaging the bearing-plates of said elevated end-portions.

9. In devices for the purpose described, the combination with a water dam having elevated end-portions, of a rectangular barrier-plate having adjustable shoes mounted upon its terminals and provided adjacent one of its longitudinal edges with a hollow air-tight compartment, said barrier-plate being disposed substantially parallel with and having its opposite edge seated upon said dam; said plate adapted to have transversely swinging movements, the compartment moving substantially from a horizontal to a vertical position, said adjustable shoes upon its terminals making contact with said elevated end-portions.

In testimony whereof we have affixed our signatures in presence of witnesses.

PHILLIP SAVARD.
ARTHUR SAVARD.

Witnesses as to Phillip Savard:
C. E. SEXTON,
R. J. MILLER.

Witnesses as to Arthur Savard:
H. FISCHER,
HIRAM A. STURGES.